US010819996B2

(12) United States Patent
Paul et al.

(10) Patent No.: US 10,819,996 B2
(45) Date of Patent: Oct. 27, 2020

(54) TECHNOLOGIES FOR INCREASING REPORTING GRANULARITY OF MEDIA RENDERING DATA TRANSFERS

(71) Applicant: Intel Corporation, Santa Clara, CA (US)

(72) Inventors: Krishna Paul, Bangalore (IN); Pankaj Mistry, Bangalore (IN)

(73) Assignee: Intel Corporation, Santa Clara, CA (US)

(*) Notice: Subject to any disclaimer, the term of this patent is extended or adjusted under 35 U.S.C. 154(b) by 53 days.

(21) Appl. No.: 16/059,605

(22) Filed: Aug. 9, 2018

(65) Prior Publication Data
US 2019/0045204 A1    Feb. 7, 2019

(51) Int. Cl.
*G06F 13/12*    (2006.01)
*H04N 19/433*   (2014.01)
*G06F 13/16*    (2006.01)
*G06F 13/38*    (2006.01)

(52) U.S. Cl.
CPC ....... *H04N 19/433* (2014.11); *G06F 13/1663* (2013.01); *G06F 13/1673* (2013.01); *G06F 13/387* (2013.01)

(58) Field of Classification Search
CPC .. G06F 13/00; G06F 13/1663; G06F 13/1673; H04N 19/433

USPC ........................................... 710/52, 100, 22
See application file for complete search history.

(56) References Cited

U.S. PATENT DOCUMENTS

| | | | |
|---|---|---|---|
| 9,025,261 B1* | 5/2015 | Hasegawa | G11B 20/00007 360/71 |
| 2006/0143336 A1* | 6/2006 | Stroobach | G06F 9/4812 710/58 |
| 2010/0057948 A1* | 3/2010 | Hemmi | G06F 3/0625 710/20 |
| 2015/0281297 A1* | 10/2015 | Chamberlin | G06F 12/1408 709/219 |

\* cited by examiner

*Primary Examiner* — Tim T Vo
*Assistant Examiner* — Kim T Huynh
(74) *Attorney, Agent, or Firm* — Barnes & Thornburg LLP

(57) ABSTRACT

Technologies for increasing the reporting granularity of media render data transfers includes determining an estimated amount of transferred media data transferred by a direct memory access (DMA) controller of a compute device to a render link based on an elapsed time since the initiation of the rendering process and a data transfer rate of the render link. In some embodiments, an error value indicative of a difference between the estimated amount of transferred media data and a reported amount of transferred media data by the DMA controller is determined. If the error value fails to satisfy a threshold error value, the estimated amount of transferred media data may be determined based on a mean error value of previously determined estimated amount of transferred media data.

21 Claims, 7 Drawing Sheets

TECHNOLOGIES FOR INCREASING REPORTING GRANULARITY OF MEDIA RENDERING DATA TRANSFERS

BACKGROUND

Many media devices, such as computers, televisions, smartphones, and other entertainment devices, are capable of rendering media to a user. For example, such media devices may render video, audio, and/or multimedia on an output device such as a display and/or speaker. During a typical rendering process, a media software stack is executed by the media device to control the rendering of the media. To do so, the media software stack typically configures a render link of the media device to a particular bitrate for media data transfers (i.e., the speed at which the media is rendered). Once the media rendering process commences, the media software stack copies the media to be rendered to a shared buffer, which is typically transferred to the render link by direct memory accesses (DMA) via a DMA controller. The DMA controller attempts to transfer the media data from the shared buffer to the render link at the configured bitrate. Due to various issues, such as data congestion, the actual bitrate of transfer may be less than the configured bitrate.

To ensure proper syncing of the media data, the media software stack may probe the DMA controller for various statistics, including the amount of data transferred from the start of the rendering process and/or since the last probe. The DMA controller is typically configured to periodically update the amount of transferred data at a particular reporting granularity (e.g., every N milliseconds). However, in some cases, the media software stack may expect, or otherwise require, a different reporting granularity than supported by the DMA controller hardware. Because the media software stack relies on the reported amount of transferred data to determine when to copy additional data to the shared buffer, the DMA controller can overtake the media software stack. That is, in such cases, the DMA controller may transfer data from the shared buffer to the render link at a pace faster than the media software stack has copied the media data to the shared buffer resulting in the transfer of erroneous data to the render link.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
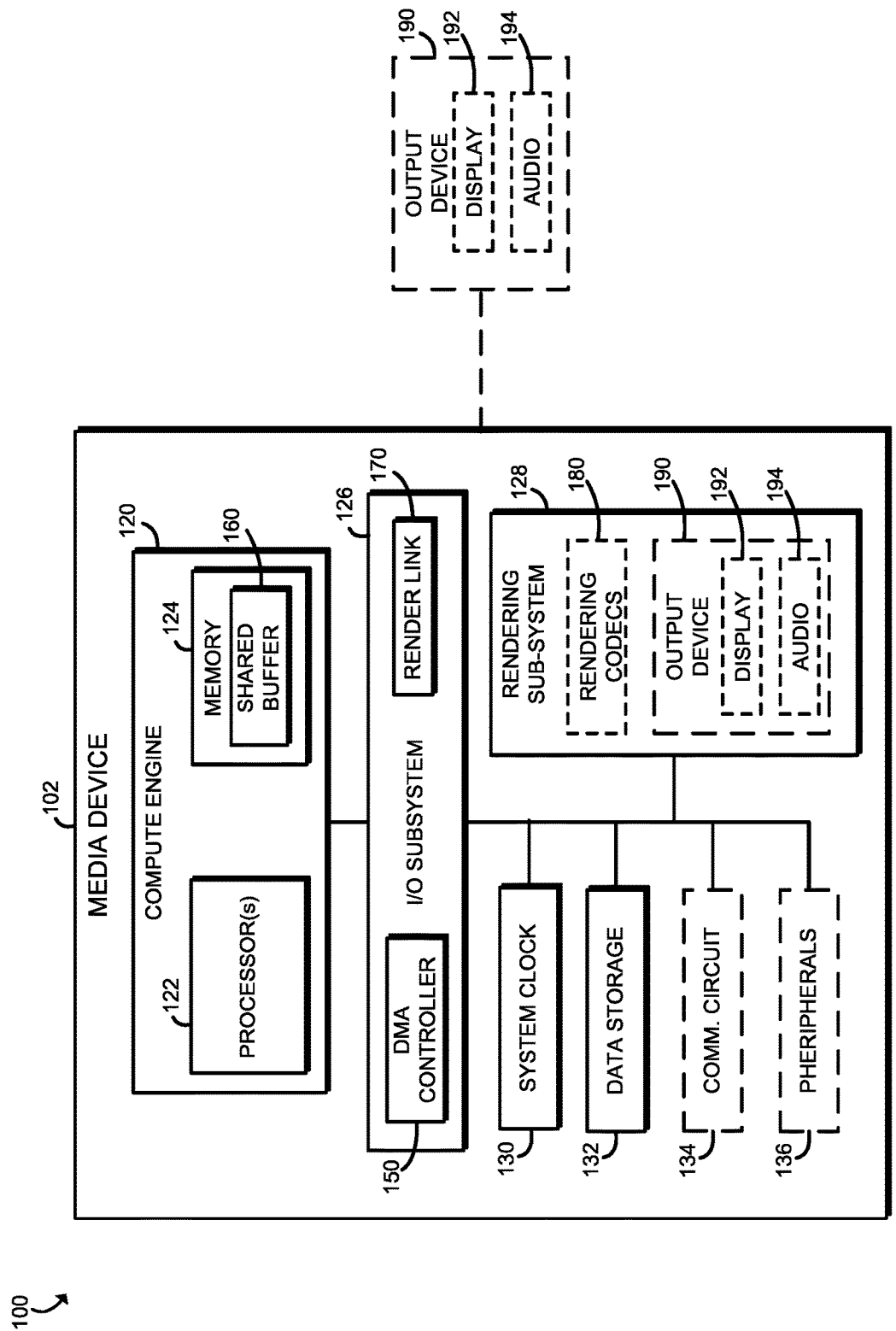
FIG. 1 is a simplified block diagram of at least one embodiment of a system for modifying the reporting granularity of media rendering data transfers.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for modifying the reporting granularity of media rendering data transfers includes a media device 102. The media device 102 may be embodied as any type of media device capable of rendering media for output to a user. For example, the media device 102 may be embodied as a compute device, an entertainment device such as a smart television, an audio player, a smartphone, a smart appliance, a tablet computer, a laptop computer, a media server, a networked media device, a microprocessor device, and/or other electronic device capable of rendering media to a user.

The illustrative media device 102 includes a compute engine 120, an I/O subsystem 126 including a DMA controller 150, a rendering sub-system 128, a system clock 130, and a data storage 132. Of course, the media device 102 may include additional or other components in other embodiments depending on, for example, the type of media device 102.

In use, as discussed in more detail below, the media device 102 is configured to perform a rendering process to render media stored in the data storage 132, or other source location, on the rendering sub-system 128 for consumption by a user of the media device 102. To do so, the media device 102 may establish, or otherwise, execute a media player engine 510 (see FIG. 5), which copies media data to be rendered from the source location (e.g., the data storage 132) to a shared buffer 160. The DMA controller 150, in turn, transfers blocks of the media data from the shared buffer to a render link 170 for rendering by the rendering sub-system 128. As the DMA controller 150 transfers the blocks of media data from the shared buffer 160, the DMA controller 150 is configured to periodically update its read position, i.e., the amount of transferred media data, at a particular reporting granularity (i.e., at predefined temporal intervals). For example, in the illustrative embodiments, the DMA controller 150, or other component of the media device 102, may periodically write a value indicative of the amount of transferred data to a register or other memory location at the reporting granularity. In the illustrative embodiment, the reporting granularity of the DMA controller 150 is "hard coded" into the DMA controller 150 and/or is otherwise be unmodifiable.

During the rendering process, the media player engine 510 may periodically determine the read position of the shared buffer 160 of the DMA controller 150 (i.e., the amount of media data of the shared buffer 160 that the DMA controller 150 has transferred). To do so, for example, the media player engine 510 may check the memory location at which the value indicative of the amount of media data transferred by the DMA controller 150 is stored. The media player engine 510 checks read position of the DMA controller 150 at a particular reporting granularity and copies the media data to the shared buffer 160 based on the reported read position of the DMA controller 150 (i.e., based on the present amount of media data transferred from the shared buffer 160 by the DMA controller 150). However, depending on the particular media player engine 510, the reporting granularities of the media player engine 510 and the DMA controller 150 may not match. For example, in some embodiments, the media player engine 510 may have a higher reporting granularity than the DMA controller 150. That is, the media player engine 510 may require the reporting of the read position of the DMA controller 150 (i.e. the amount of media data that the DMA controller 150 has transferred from the shared buffer 160) at a higher frequency than the DMA controller 150 updates its read position. Under such conditions, the media player engine 510 may fail to copy enough media data into the shared buffer 160 at a sufficient rate. As such, if the disparity in reporting granularities between the media player engine 510 and the DMA controller 150 is not compensated, the DMA controller 150 can overshoot the media data copied into the shared buffer 160 by the media player engine 510 and begin transferring erroneous data from the shared buffer 160.

Figure 2:
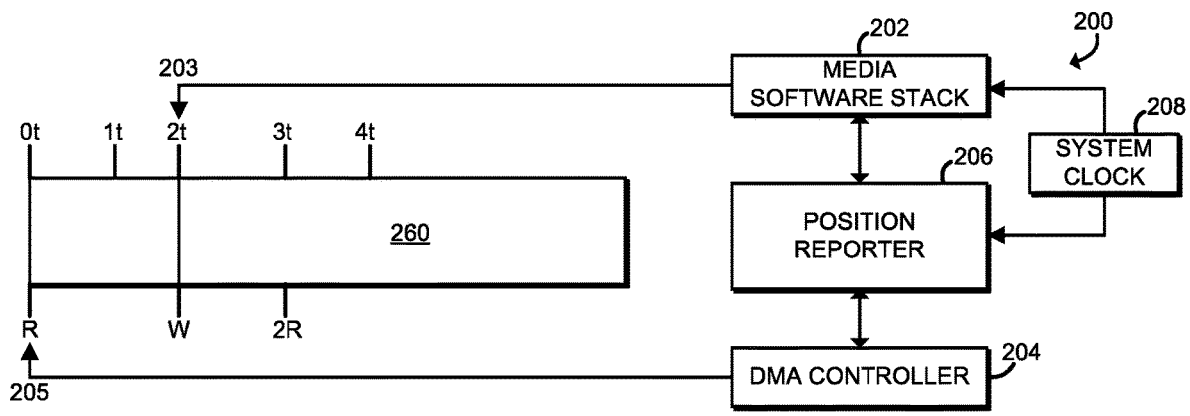
FIGS. 2-4 are simplified block diagrams of a typical media data transfer process in which the reporting granularity of a direct memory access (DMA) controller is less than the required reporting granularity of the media software stack.
Figure 3:
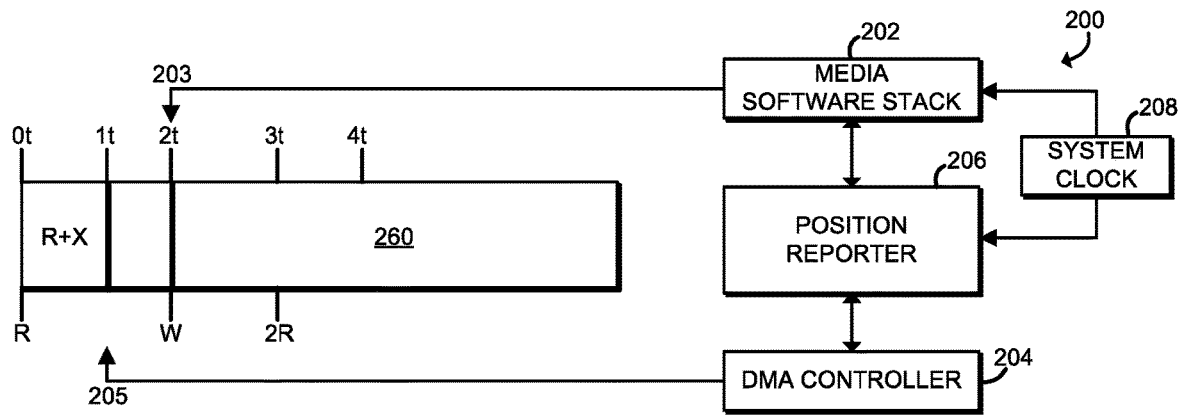
Figure 4:
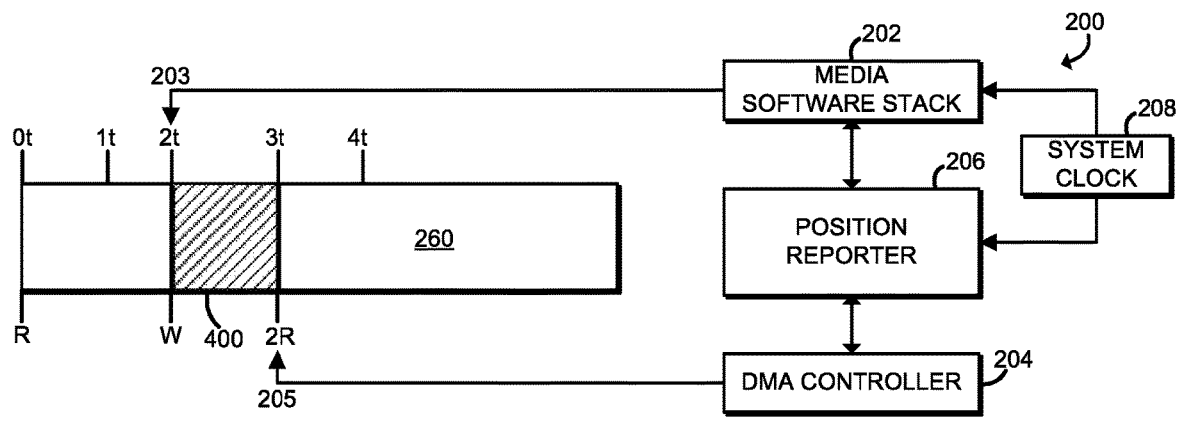

A rendering process of a typical media device 200 having no reporting granularity compensation is shown in FIGS. 2-4. The typical media device 200 includes a media software stack 202, which may form part of a media player engine of the media device 200, a DMA controller 204, a position reporter 206, and a system clock 208. Illustratively, the media software stack 202 has a reporting granularity that is greater than the reporting granularity of the DMA controller 204. That is, the media software stack 202 requires reporting of the read position of the DMA controller 204, which is provided by the position reporter 206, at a higher frequency (i.e., more often) than the DMA controller 204 is capable of reporting. As discussed above, the media software stack 202 uses the reported read position of the DMA controller 204 (i.e., how much media data the DMA controller 204 has transferred) to determine when and/or the rate at which to copy additional media data into the shared buffer 260. As such, if the DMA controller 204 does not update its read position at a sufficient granularity, the media software stack 202 may fall behind the read position of the DMA controller 204 resulting in erroneous data being transferred by the DMA controller 204 as illustratively shown in FIGS. 2-4.

In the illustrative example of FIGS. 2-4, the media software stack 202 has a reporting granularity requirement of 1t. That is, every 1t, the media software stack 202 queries the DMA controller 204, or the position reporter 206, for its current read position (i.e., the amount of media data that the DMA controller 204 has transferred from the shared buffer 260). Conversely, the DMA controller 204 has a reporting granularity of 3t. That is, at every 3t, the DMA controller 204 updates its read position (i.e., the amount of media data the DMA controller 204 has transferred). As such, the illustrative media software stack 202 has a higher reporting granularity requirement relative to the reporting granularity of the DMA controller 204.

As such, at time 0t as shown in FIG. 2, the media software stack 202 has copied W-bytes of media data from a source location to the shared buffer 260 as indicated by the write pointer 203. Additionally, at time 0t, the DMA controller 204 has transferred or read R-bytes of media data from the shared buffer 260 (depending on the data transfer rate of the render link of the illustrative media device 200), as indicated by the read position pointer 205. Subsequently, at time 1t as shown in FIG. 3, the DMA controller 204 has transferred (R+X)-bytes of media data as indicated by the read position pointer 205. However, because the DMA controller 204 updates its read position every 3t, the position reporter 206 still reports the DMA controller 204 has transferred only R-bytes of data when queried by the media software stack 202 at time 1t.

Similarly, at time 2t (not shown), the DMA controller 204 has transferred (R+W)-bytes of media data; however, the position reporter 206 continues to report the DMA controller 204 has transferred only R-bytes of data when queried by the media software stack at time 2t. Subsequently, at time 3t as shown in FIG. 4, the DMA controller 204 has transferred 2R-bytes of media data, which now includes erroneous data 400 (i.e., data beyond the W-bytes of data copied by the media software stack 202). Accordingly, the DMA controller 204 updates its position at time 3t to indicate that 2R-bytes of data have been transferred. As such, when queried by the media software stack 202 at time 3t, the position reporter 206 now reports that the DMA controller 204 has transferred 2R-bytes of media data. However, because the reporting granularity of the DMA controller 204 is less than the reporting granularity requirement of the media software stack 202, the media software stack 202 has failed to sufficiently fill the shared buffer 160 resulting in the erroneous data 400 being transferred by the DMA controller 204. As the disparity between the reporting granularities of the media software stack 202 and the DMA controller 204 increases, the risk of inadvertently transferring erroneous data increases.

Referring back to FIG. 1 and as discussed in more detail below, the illustrative media device 102 is configured to compensate for disparity in the reporting granularities of the media player engine 510 and the DMA controller 150 by estimating the read position of the DMA controller 150 at the reporting granularity required by the media player engine 510. To do so, the media device 102 is configured to estimate the amount of data transferred by the DMA controller 150 based on the transfer rate of the render link 170 and the amount of elapsed time since the initiation of the rendering process (i.e., how long the DMA controller 150 has been transferring media data from the shared buffer 160). By estimating the position of the DMA controller 150 at a higher granularity than reported by the DMA controller 150, the media device 102 can respond to queries from the media player engine 510 at a higher granularity, which allows the media player engine 510 to properly maintain a sufficient amount of media data in the shared buffer 160 to avoid the overshooting of media data by the DMA controller 150. To further improve the accuracy of the estimated position of the DMA controller 150, the media device 102 may be configured to estimate the position of the DMA controller 150 based on a mean error value between the position reported by the DMA controller 150 and the estimated position, which is estimated based on the transfer rate of the render link 170 and the amount of elapsed time since the initiation of the rendering process. That is, as discussed in more detail below, the media device may adjust the initial estimated position by the mean error value to better track the actual position of the DMA controller 150.

As discussed above, the illustrative media device includes the compute engine 120, the I/O subsystem 126, the rendering sub-system 128, the system clock 130, and the data storage 132. The compute engine 120 may be embodied as any type of device or collection of devices capable of performing the various compute functions described herein. In some embodiments, the compute engine 120 may be embodied as a single device, such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 120 may include, or may be embodied as, one or more processors 122 (i.e., one or more central processing units (CPUs)) and memory 124.

The processor(s) 122 may be embodied as any type of processor capable of performing the functions described herein. For example, the processor(s) 122 may be embodied as one or more single-core processors, one or more multi-core processors, a digital signal processor, a microcontroller, or other processor or processing/controlling circuit(s). In some embodiments, the processor(s) 122 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 124 may be embodied as any type of volatile (e.g., dynamic random access memory (DRAM), etc.) or non-volatile memory or data storage capable of performing the functions described herein. It should be appreciated that the memory 124 may include main memory (i.e., a primary memory) and/or cache memory (i.e., memory that can be accessed more quickly than the main memory). Volatile memory may be embodied as any storage medium that requires power to maintain the state of data stored by the medium. Non-limiting examples of volatile memory may include various types of random access memory (RAM), such as dynamic random access memory (DRAM) or static random access memory (SRAM). In the illustrative embodiment, the memory 124 includes the shared buffer 160. The shared buffer 160 may be embodied as any type of memory location capable of storing media data. For example, the shared buffer 160 may be embodied as a dedicated region of the memory 124 in some embodiments.

The compute engine 120 is communicatively coupled to other components of the media device 102 via the I/O subsystem 126, which may be embodied as circuitry and/or components to facilitate input/output operations with the processor 122, the memory 124, and other components of the media device 102. For example, the I/O subsystem 126 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 126 may form a portion of a system-on-a-chip (SoC) and be incorporated, along with the compute engine 120 (e.g., the processor 122, the memory 124, etc.) and/or other components of the media device 102, on a single integrated circuit chip.

In the illustrative embodiment, the I/O subsystem 126 includes the DMA controller 150 and the render link 170. The DMA controller 150 may be embodied as any type of control circuit, electronic device, or collection of circuits and/or electronic devices capable of transferring media data from the shared buffer 160 to the render link 170. For example, in some embodiments, the DMA controller 150 may be embodied as a dedicated circuit component to perform the functions described herein. However, in other embodiments, the DMA controller 150 may form a part of or otherwise be embodied in the compute engine 120.

The render link 170 may be embodied as any type of electrical interconnect capable of communicatively connecting the DMA controller 150 and the rendering sub-system 128. For example, the render link 170 may be embodied as a data bus in some embodiments. As discussed above, the data transfer rate of the render link 170 may be set or modified by the media player engine 510 during operation.

The rendering sub-system 128 may be embodied as any collection of hardware, software, and/or firmware for facilitating the rendering and output of media to a user of the media device 102. For example, the rendering sub-system 128 may include various rendering codecs 180 and one or more output devices 190. The codecs 180 may be embodied as any type of hardware device, software, and/or firmware capable of encoding and decoding data to facilitate the rendering and output of the media data to the user. Similarly, the output devices 190 may be embodied as any type of hardware device or component capable of generating an output to a user. For example, the output devices 190 may include one or more display devices 192 and/or one or more audio devices 194. Each of the display devices 192 may be embodied as any type of device capable of displaying information to a user. For example, the display device 192 may be embodied as a liquid crystal display (LCD), a light emitting diode (LED) display, an organic light emitting diode (OLED) display, a plasma display, a cathode ray tube (CRT), or other type of display device. Similarly, each of the audio devices 194 may be as any type of device capable of generating audible information to a user. For example, the audio device 194 may be embodied as a speaker or the like.

In some embodiments, one or more of the output devices 190 may be remote from the media device 102 as shown in dashed line in FIG. 1. For example, a display device 192 and/or an audio device 194 may be separate from, but connected to, the media device 102 to allow the rendered media to be provided to the user.

The system clock 130 may be embodied as any type of device, circuit, and/or collection of devices or circuits capable of generating a clock signal usable by other components of the media device 102. For example, the system clock 130 may be embodied as, or otherwise include, a crystal oscillator-based circuit. As discussed in more detail below, the clock signal generated by the system clock 130 may be used by other components of the media device 102 to synchronize various actions such as writing to and reading from the shared buffer 160, determining an elapsed time of the rendering process, and so forth.

The one or more data storage devices 132 may be embodied as any type of storage device(s) configured for short-term or long-term storage of data, such as, for example, memory devices and circuits, memory cards, hard disk drives, solid-state drives, or other data storage devices. In some embodiments, the data storage devices 132 may store various data to facilitate the operation of the media device 102 such an operating system, firmware code, and other data.

In some embodiments, the media device 102 may also include communication circuitry 134 and/or peripheral devices 136. The communication circuitry 134 may be embodied as any communication circuit, device, or collection thereof, capable of enabling communications between media device 102 and other devices of the system 100, such as a network gateway. Accordingly, the communication circuitry 134 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The one or more peripheral devices 136 may include any type of device that is usable to input information into the media device 102 and/or receive information from the media device 102. The peripheral devices 136 may be embodied as any auxiliary device usable to input information into the media device 102, such as a keyboard, a mouse, a microphone, a barcode reader, an image scanner, etc., or output information from the media device 102, such as a display, a speaker, graphics circuitry, a printer, a projector, etc. It should be appreciated that, in some embodiments, one or more of the peripheral devices 136 may function as both an input device and an output device (e.g., a touchscreen display, a digitizer on top of a display screen, etc.). It should be further appreciated that the types of peripheral devices 136 connected to the media device 102 may depend on, for example, the type and/or intended use of the media device 102. Additionally or alternatively, in some embodiments, the peripheral devices 136 may include one or more ports, such as a USB port, for example, for connecting external peripheral devices to the media device 102.

Figure 5:
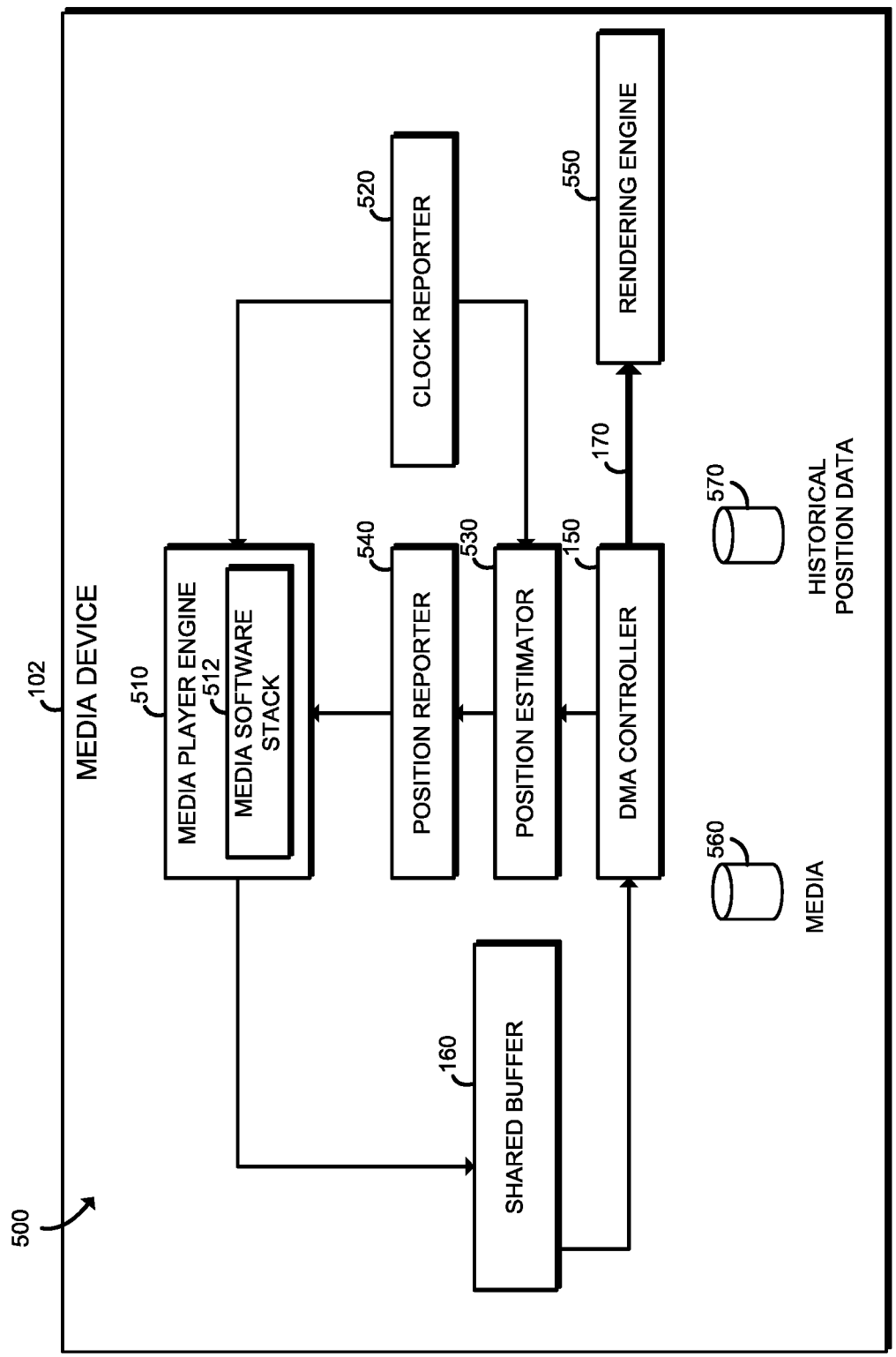
FIG. 5 is a simplified block diagram of at least one embodiment of an environment that may be established by a media device of the system of FIG. 1.

Referring now to FIG. 5, the media device 102 establishes an environment 500 during operation. The illustrative environment 500 includes the media player engine 510, the DMA controller 150, the shared buffer 160, a clock reporter 520, a position estimator 530, a position reporter 540, and a rendering engine 550. The various components of the environment 500 may be embodied as hardware, firmware, software, or a combination thereof. As such, in some embodiments, one or more of the components of the environment 500 may be embodied as circuitry or collection of electrical devices (e.g., a media player engine circuit, 510, a clock reporter circuit 520, a position estimator circuit 530, a position estimator circuit 530, a position reporter circuit 540, and a rendering engine circuit 550, etc.).

It should be appreciated that, in some embodiments, one or more of the illustrative components of the environment 500 may form a portion of another component and/or one or more of the illustrative components may be independent of one another. Further, in some embodiments, one or more of the components of the environment 500 may be embodied as virtualized hardware components or emulated architecture, which may be established and maintained by the compute engine 120 or other component(s) of the media device 102. Additionally, it should be appreciated that the media device 102 may include other components, sub-components, modules, sub-modules, logic, sub-logic, and/or devices commonly found in a compute device, which are not illustrated in FIG. 5 for clarity of the description.

In the illustrative embodiment, the environment 500 includes media data 560 and historical position data 570. The media data 560 may be embodied as any type of media, such as video, audio, or multi-media, capable of being rendered for output to a user via the rendering sub-system 128. The historical position data 570 includes position data indicative of previously estimated read positions of the DMA controller 150. For example, in some embodiments, the historical position data 570 includes previously determined error values indicative of calculated errors between a previous position reported by the DMA controller 150 and the corresponding estimated position, which is based on the transfer rate of the render link 170 and the amount of elapsed time since the initiation of the rendering process. Additionally or alternatively, the historical position data 570 may include the positions reported by the DMA controller 150 and the corresponding estimated positions in addition to, or instead of, the corresponding error values.

The media player engine 510, which may be embodied as hardware, firmware, software, virtualized hardware, emulated architecture, and/or a combination thereof as discussed above, is configured to control playback of the media data 560. As such, the media player engine 510 may include a user interface, various media engines and/or players, and corresponding drivers. In the illustrative embodiment, the media player engine includes a media software stack 512. The media software stack 512 may be embodied as, or otherwise include, various media engines, drivers, software, and/or firmware configured to render the media data to the user. In use, the media software stack 512 is configured to copy media from a source location, such as the data storage 132, to the shared buffer 160 at a particular bitrate based on a clock signal received from the clock reporter 520 and the present read position of the DMA controller 150. To do so, as discussed below, the media software stack 512 queries the position reporter 540 at a particular reporting granularity (i.e., a particular frequency) for the present read position of the DMA controller 150 (i.e., the amount of media data that the DMA controller 150 has transferred from the shared buffer 160). As discussed above, the media software stack 512 copies media data into the shared buffer 160 based on the reported position of the DMA controller 150.

Additionally, the media software stack 512 configures the render link 170 at a particular data transfer bitrate. In some embodiments, the data transfer rate of the render link 170 may depend on various criteria such as the underlying hardware of the render link 170, the capabilities of the rendering sub-system 128 (e.g., aspects of the rendering codecs 180), and/or other criteria. As discussed above, the data transfer rate of the render link 170 is used by the position estimator 530 to estimate the read position (i.e., the amount of media data that has been transferred) of the DMA controller 150.

The clock reporter 520, which may be embodied as hardware, firmware, software, virtualized hardware, emulated architecture, and/or a combination thereof as discussed above, is configured to generate a clock signal based on the system clock 130. The clock reporter 520 provides the clock signal to the various components of the environment 500. The clock signal is used by those components to synchronize actions such as writing to and reading from the shared buffer 160 and determining an elapsed time relative to the initiation of the media data transfer by the DMA controller 150.

As discussed above, the DMA controller 150 is configured to transfer blocks of media data from the shared buffer 160 to the rendering engine 550 via the render link 170. The DMA controller 150 transfers the media data at the data transfer rate of the render link 170 as configured by the media player engine 510 (i.e., the media software stack 512). Additionally, the DMA controller 150 updates its read position of the shared buffer 160 at a reporting granularity. That is, the DMA controller 150 updates a value indicative of the amount of media data transferred from the shared buffer 160 to the render link 170 at a particular update frequency. For example, the DMA controller 150 may be configured to write its present read position to a dedicated memory location, register, or buffer at the frequency corresponding to its reporting granularity (e.g., every t milliseconds).

As discussed above, the reporting granularity of the DMA controller 150 and the reporting granularity requirement of the media player engine 510 may not match in some embodiments. In particular, the reporting granularity requirement of the media player engine 510 may be greater than the reporting granularity of the DMA controller 150. In such embodiments, the disparity in reporting granularities between the media player engine 510 and the DMA controller 150 can result in the DMA controller overshooting the media player engine 510 and transferring erroneous data from the shared buffer 160. As such, to compensate for such disparities, the position estimator 530 is configured to estimate the read position of the DMA controller 150 at the required reporting granularity of the media player engine 510. To do so, the position estimator 530 is configured to determine an initial estimate position based on the data transfer rate of the render link 170 and the elapsed time since the initiation of the rendering process. That is, the position estimator 530 may determine an estimated read position of the DMA controller 150 by multiplying the data transfer rate by the amount of time the DMA controller 150 has been transferring media data from the shared buffer 160. The calculated elapsed time may be relative to either the start time of the initial data transfer (e.g., the start time of the rendering process) or the time of the last read position report from the DMA controller 150. The position estimator 530 may utilize the clock signal produced by the clock reporter 520 to determine the elapsed time.

If the error amount (i.e., the difference) between the initial estimated read position and the last reported read position of the DMA controller 150 is within a reference tolerance amount, the position estimator 530 may use the initial estimated position as the final estimated position, which is then provided to the position reporter 540 to report to the media player engine 510. However, if the initial estimated read position is not within the tolerance amount, the position estimator 530 may adjust the initial estimated read position based on a mean error value. As discussed in more detail below, the position estimator 530 may determine the mean error value by determining the mean of several past error values (e.g., N past error samples) between past estimated read positions and the corresponding reported read positions of the DMA controller 150. In such embodiments, the position estimator 530 may track the actual read position more accurately by adjusting the estimated amounts based on the historical difference between the initial estimates of the read position and the corresponding reported read positions.

The position reporter 540 receives the estimated read position from the position estimator 530 and responds to queries from the media player engine 510 (e.g., from the media software stack 512) for the read position of the DMA controller 150 with the estimated position. In this way, the position reporter 540 is capable of providing the estimated read position of the DMA controller 150 to the media player engine 510 at a higher granularity (i.e., at the reporting granularity requirement of the media player engine 510) than the DMA controller 150. In this way, the position reporter 540 can compensate for any disparity in the reporting granularities of the media player engine 510 and the DMA controller 150.

Figure 6:
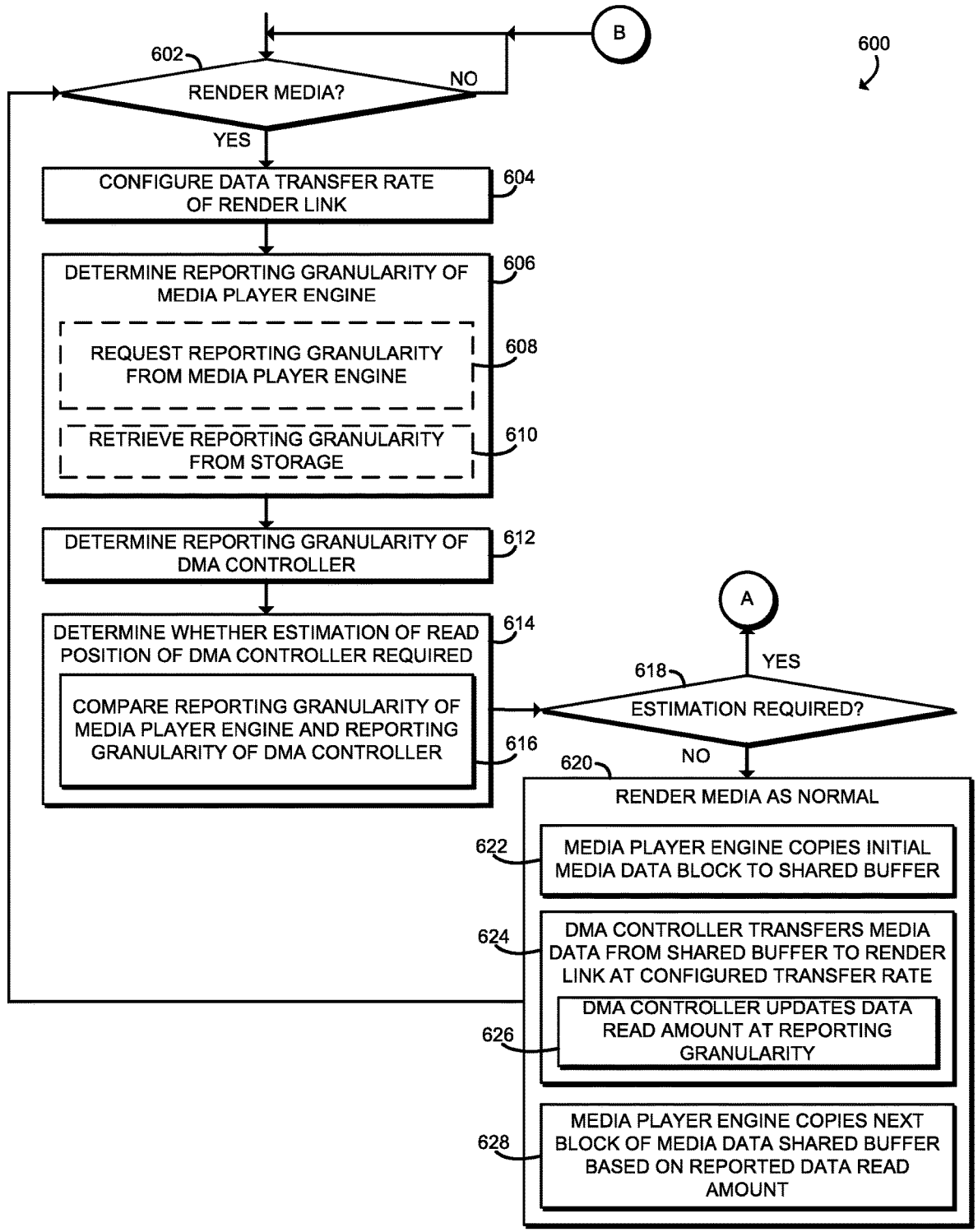
FIGS. 6 & 7 are simplified flow diagrams of at least one embodiment of a method for rendering media.
Figure 7:
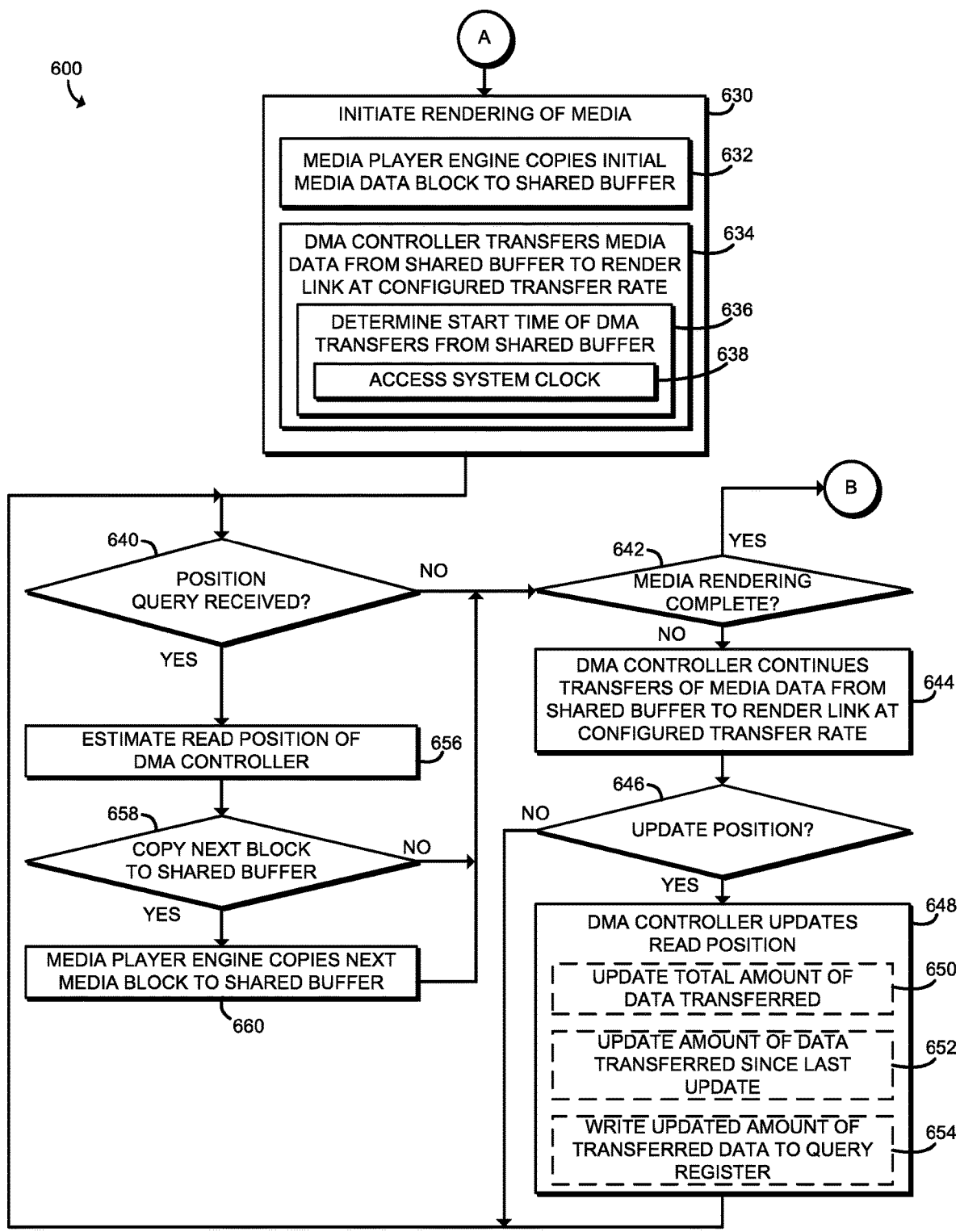

Referring now to FIGS. 6-7, the media device 102 may execute a method 600 for rendering media. The method 600 begins with block 602 in which the media device 102 determines whether to render media to a user. For example, in some embodiments, the user may interact with the media player engine 510 to initiate playback of the media. If so, the method 600 advances to block 604 in which the media device 102 (e.g., the media software stack 512 of the media player engine 510) configures the data transfer rate of the render link 170. As discussed above, the particular data transfer rate of the render link 170 may depend on various criteria such as the underlying hardware of the render link 170, the capabilities of the rendering sub-system 128 (e.g., aspects of the rendering codecs 180), and/or other criteria.

Subsequently, in block 606, the media device 102 determines the reporting granularity of the media player engine 510. For example, the reporting granularity requirement of the media software stack 512 of the media player engine 510 may be determined. To do so, in some embodiments in block 608, the media device 102 (e.g., the position estimator 530) may request the reporting granularity from the media player engine 510 and/or the media software stack 512. In other embodiments, in block 610, the media device 102 may retrieve the reporting granularity from storage, such as a memory location of the memory 124 or from the data storage 132. Regardless, as discussed above, the reporting granularity of the media player engine 510 defines the frequency at which the media player engine 510 queries for the present read position of the DMA controller 150. Based on the present read position of the DMA controller 150, the media player engine 510 copies media data into the shared buffer 160 as discussed below.

In block 612, the media device 102 also determines the reporting granularity of the DMA controller 150. Similar to the media player engine 510, the media device 102 may determine the reporting granularity of the DMA controller 150 by requesting the value of the reporting granularity from the DMA controller 150, retrieving the value of the reporting granularity from storage, or the like. As discussed above, the reporting granularity of the DMA controller 150 defines the frequency at which the DMA controller 150 updates its read position (i.e., the amount of data the DMA controller 150 has transferred from the shared buffer 160).

After the media device 102 has determined the reporting granularities of the media player engine 510 and the DMA controller 150, the method 600 advances to block 614 in which the media device 102 determines whether estimation of the read position of the DMA controller 150 is required. To do so, in block 616, the media device 102 may compare the reporting granularities of the media player engine 510 and the DMA controller 150. If the reporting granularity of the media player engine 510 is greater than the DMA controller 150 (i.e., the media player engine 510 requires more frequent read position updates than the DMA controller 150 provides), the media device 102 determines that read position estimation is required.

If, in block 618, the media device 102 determines that read position estimation is not required, the method 600 advances to block 620 in which the media device 102 renders the media as normal (i.e., without estimation of the read position of the DMA controller 150). For example, in block 622, the media player engine 510 copies an initial block of media data from the source location to the shared buffer 160. In block 624, the DMA controller 150 transfers media data from the shared buffer 160 to the render link 170 at the data transfer rate configured in block 604. While doing so, the DMA controller 150 updates its read position (i.e., the amount of media data that has been transferred from the shared buffer 160) at its reporting granularity in block 626. In block 628, the media player engine 510 copies the next block of media data from the source location to the shared buffer 160 based on the reported read position of the DMA controller 150. After the media has been completely rendered, the method 600 loops back to block 602 in which the media device 102 determines whether to render additional or other media.

Referring back to block 618, if the media device 102 determines that read position estimation is required, the method 600 advances to block 630 of FIG. 7. In block 630, the media device initiates the rendering of the media using read position estimation. To do so, in block 632, the media player engine 510 copies an initial media data block from the source location to the shared buffer 160. In block 634, the DMA controller 150 commences the transferring of media data from the shared buffer 160 to the render link at data transfer rate configured in block 604. Additionally, in block 636, the media device 102 determines the start time of the media data transfers from the shared buffer 160 by the DMA controller 150. To do so, in block 638, the media device 102 may access the system clock 130 to determine the start time.

The method 600 subsequently advances to block 640 in which the media device 102 determines whether the media player engine 510 (e.g., the media software stack 512) has queried the read position of the DMA controller 150. As discussed above, the media player engine 510 queries for the read position of the DMA controller 150 at a particular reporting granularity requirement. If no such query has been received, the method 600 advances to block 642 in which the media device 102 determines whether the media rendering is complete. If so, the method 600 loops back to block 602 in which the media device 102 determines whether to render additional or other media. However, if the media rendering is not complete, the method 600 advances to block 644 in which the DMA controller 150 continues to transfer media data from the shared buffer 160 to the render link 170 at the data transfer rate configured in block 604.

Subsequently, in block 646, the media device 102 determines whether the DMA controller 150 is to update its present read position. As discussed above, the DMA controller 150 is configured to update its read position (i.e., the amount of media data transferred from the shared buffer 160) at a particular reporting granularity. If the DMA controller 150 is to update its present read position, the method 600 advances to block 648 in which the DMA controller 150 updates its read position. For example, in block 650, the DMA controller 150 may update the total amount of media data transferred from the shared buffer 160 by the DMA controller 150 since the initiation of the rendering process. Alternatively, in block 652, the DMA controller 150 may update the amount of media data transferred from the shared buffer 160 by the DMA controller 150 since the last read position update by the DMA controller 150. Regardless, in block 654, the DMA controller writes the updated amount of transferred media data to a query register or memory location, which may be accessible to other components of the media device 102 (e.g., the position estimator 530). After the DMA controller 150 has updated its present read position in block 648 or if the media device 102 determines that no update is to occur in block 646, the method 600 loops back to block 640 in which the media device 102 determines whether the media player engine 510 (e.g., the media software stack 512) has queried the present read position of the DMA controller 150.

If the media device 102 determines that the media player engine 510 has queried the present read position of the DMA controller 150, the method 600 advances to block 656 in which the media device 102 estimates the read position of the DMA controller 150 (i.e., the amount of media data transferred from the shared buffer 160). To do so, the media device 102 may execute a method 800 estimating a read position of the DMA controller 150, which is described below in regard to FIGS. 8 and 9.

After the media device 102 has estimated the present read position of the DMA controller 150, the method 600 advances to block 658. In block 658, the media device 102 determines whether the media player engine 510 is to copy the block of media data to the shared buffer 160. As discussed above, the media software stack 512 of the media player engine 510 copies media data form the source location to the shared buffer 160 based on the reporting granularity requirement of the media software stack 512 and the present read position of the DMA controller 150. If the media device 102 determines that the media player engine 510 is not to copy the next block of media data to the shared buffer 160, the method 600 advances to block 642 in which the media device 102 determines whether the media rendering is complete as discussed above. However, if the media device 102 determines that the media player engine 510 is to copy the next block of media data to the shared buffer 160, the method 600 advances to block 660. In block 660, the media player engine 510 copies the next block of media data from the source location to the shared buffer 160. The amount of media data copied may be determined by the media player engine 510. After the media player engine 510 has transferred the next block of media data to the shared buffer 160, the method 600 advances to block 642 discussed above.

Figure 8:
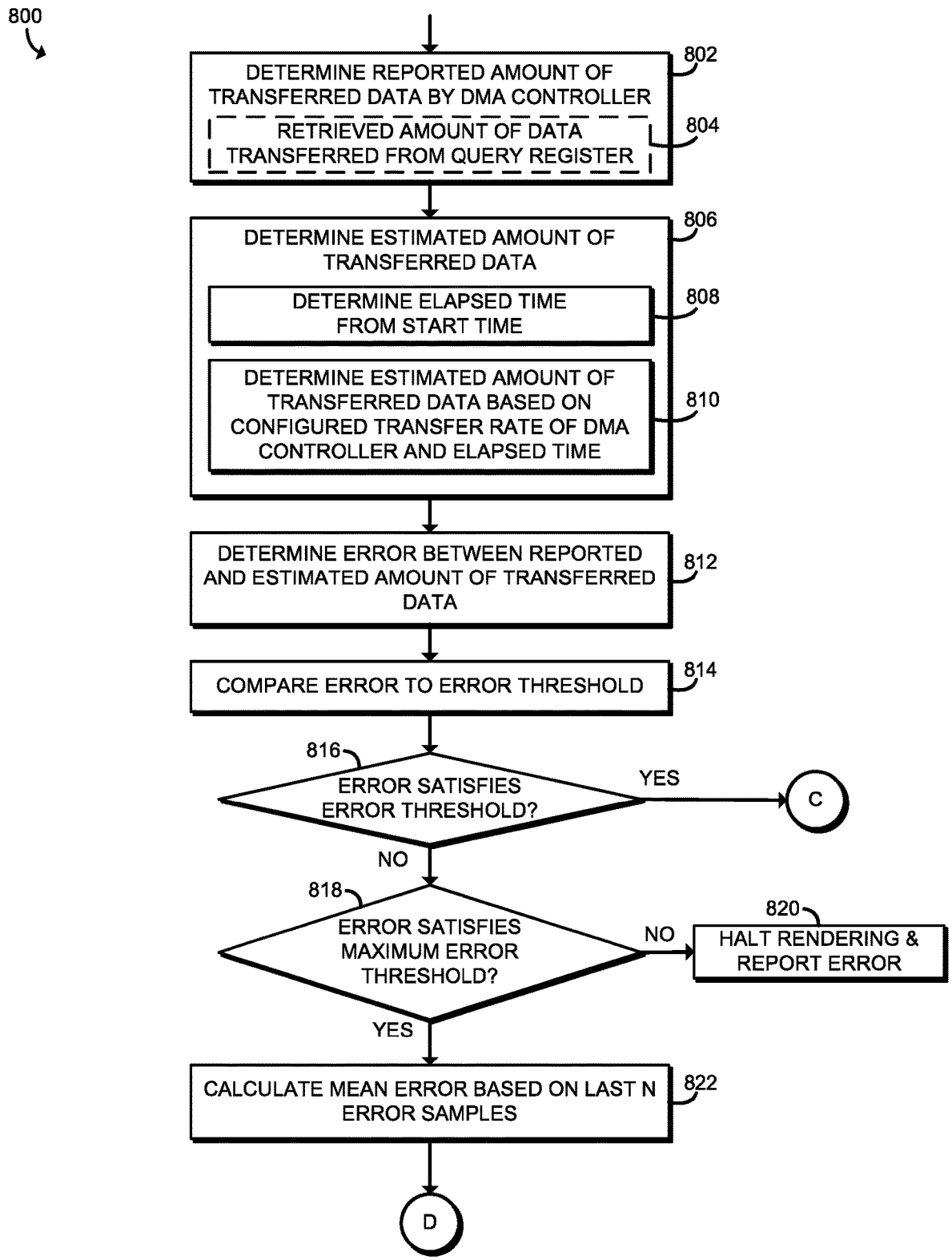
FIGS. 8 & 9 are simplified flow diagrams of at least one embodiment of a method for estimating a read position of a DMA controller of the media device of FIGS. 1 & 5.
Figure 9:
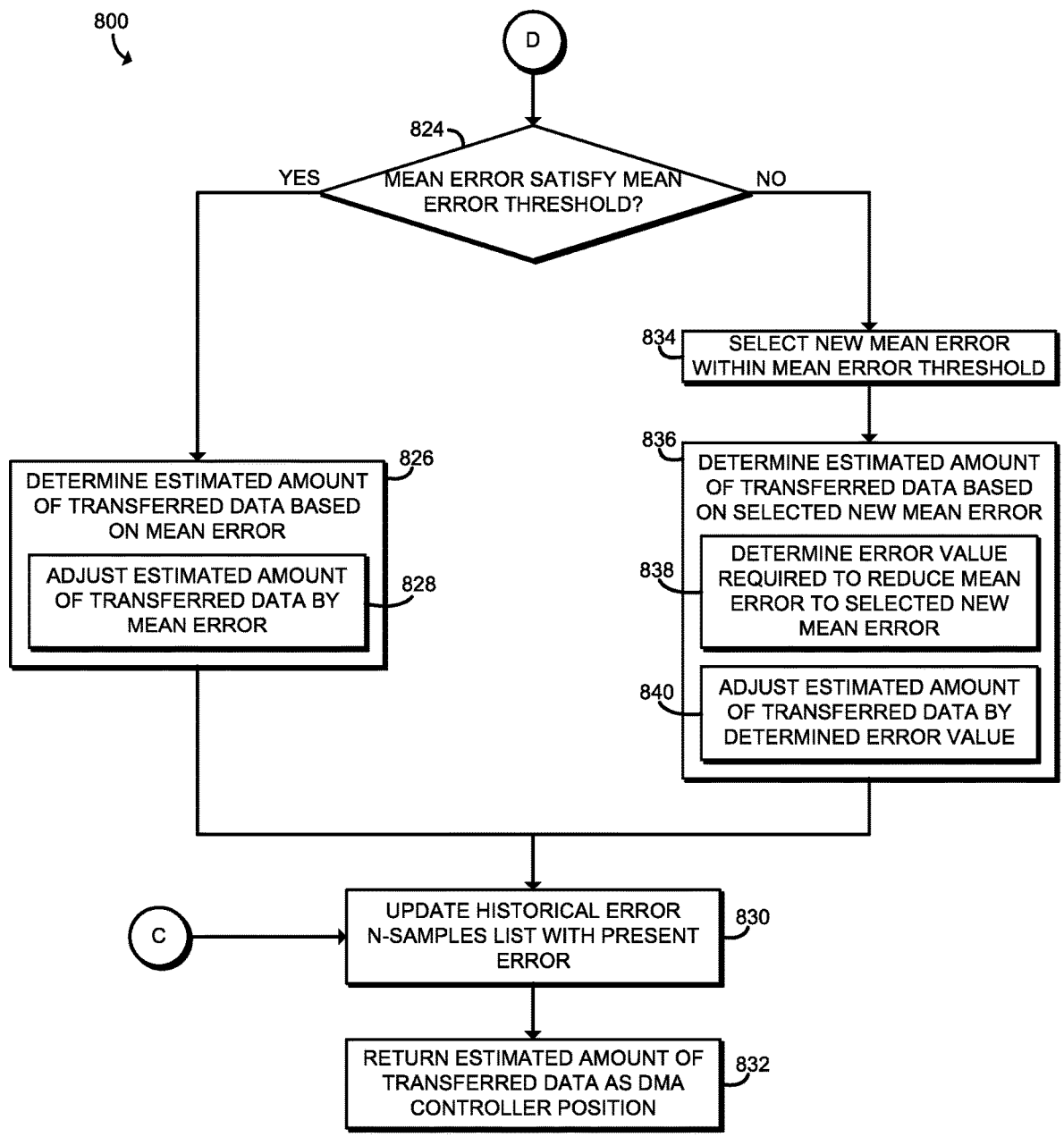

Referring now to FIGS. 8 and 9, the media device 102 may execute a method 800 for estimating a read position of the DMA controller 150. As discussed above, the media device 102 may execute the method 800 as part of block 656 of method 600. The method 800 begins with block 820 in which the media device 102 (e.g., the position estimator 530) determines the present amount of transferred media data reported by the DMA controller 150 in block 648 of method 600. For example, the media device 102 may retrieve the reported amount of media data from the query register in block 804.

Subsequently, in block 806, the media device 102 (e.g., the position estimator 530) determines an estimated amount of media data transferred by the DMA controller 150. To do so, in block 808, the media device 102 may determine an elapsed time since the start time of the media data transfers by the DMA controller 150 as determined in block 636 of method 600. Additionally, in block 810, the media device 102 determines the estimated amount of transferred media data based on the data transfer rate the render link 170, as configured in block 604 of method 600, and the elapsed time as determined in block 808. For example, the media device 102 may perform a simple multiplication of the data transfer rate and the elapsed time to determine the estimated amount of transferred media data.

In block 812, the media device 102 determines the error between the amount of transferred media data reported by the DMA controller (as determined in block 802) and the estimated amount of transferred media data. For example, the media device 102 may determine an error value indicative of the difference between the reported and estimated amounts of transferred data. The media device 102 subsequently compares the determined error to an error threshold in block 814. In the illustrative embodiment, the error threshold is embodied as a tolerance range (i.e., a + or − range of error). If the media device 102 determines that the determined error satisfies the error threshold (e.g., is within the error tolerance range) in block 816, the method 800 advances to block 830 of FIG. 9 discussed below. However, if the media device 102 determines that the determined error between the reported and estimated amounts of transferred data does not satisfy the error threshold (e.g., is outside the error tolerance range), the method 800 advances to block 818. In block 818, the media device 102 determines whether the determined error satisfies a maximum error threshold (e.g., is within a maximum error tolerance range). If the media device 102 determines that the determined error does not satisfy the maximum error threshold (e.g. is outside the maximum error tolerance range), the method 800 advances to block 820 in which the media device 102 halts the media rendering process and reports an error. In some embodiments, the media device 102 may perform additional error handling procedures in block 820.

Referring back to block 818, if the media device 102 determines that the determined error does satisfy the maximum error threshold (e.g. is within the maximum error tolerance range), the method 800 advances to block 822. In block 822, the media device 102 calculates a mean error based on a reference number (N) of previous error samples. That is, as discussed below, the media device 102 is configured to store consecutive error values as determined in block 812. In the illustrative embodiment, for example, the media device 102 stores the consecutive error values in a first-in-first-out (FIFO) buffer such that a shifting window of error values is formed. For example, in an illustrative embodiment, the media device 102 may store the last ten error values. In such an embodiment, the media device 102 may determine the mean error value by determining the mean of those stored ten error values. Of course, in other embodiments, the media device 102 may store the reported and estimated amount of transferred media data rather than, or in addition to, the determined error values.

Regardless, after the media device 102 has determined the mean error in block 822, the method 800 advances to block 824 of FIG. 9. In block 824, the media device 102 determines whether the determined mean error satisfies a mean error threshold (e.g. is within a mean error tolerance range). If so, the method 800 advances to block 826 in which the media device 102 determines the estimated amount of transferred data based on the mean error determined in block 822. To do so, in block 828, the media device 102 may adjust the initial estimated amount of transferred media data, as determined in block 806, by the determined mean error value. That is, the media device 102 may increase or decrease the estimated amount of transferred data based on the value of the mean error. It should be appreciated that by adjusting the estimated amount of transferred media data, the estimated amount of transferred media data may better track the actual amount of transferred media data.

The method 800 subsequently advances to block 830 in which the media device 102 updates the list of historical, consecutive error values with the error value determined in block 812. In doing so, the media device 102 may discard the oldest error value in those embodiments in which the historical list is a FIFO-based list. After the media device 102 has updated the historical error list in block 830, the method 800 advances to block 832 in which the media device 102 returns the estimated amount of transferred media data as the read position of the DMA controller 150.

Referring back to block 824, if the media device 102 determines that the determined mean error does not satisfy the mean error threshold (e.g. is outside the mean error tolerance range), the method 800 advances to block 834. In block 834, the media device 102 selects or determines a new mean error target value that satisfies the mean error threshold (i.e., is within the mean error tolerance range). Subsequently, in block 836, the media device 102 determines the estimated amount of transferred data based on the selected new mean error. To do so, in block 838, the media device 102 determines an error value required to reduce the mean error to the selected new mean error. That is, the media device 102 determines an error that, when averaged with the historical error values, produces a mean error equal to the new mean error selected in block 834. Subsequently, in block 840, the media device adjusts the estimated amount of transferred media data by the error value determined in block 838.

After the estimated amount of transferred media data has been determined in block 836, the method 800 advances to block 830. In block 830, the media device 102 updates the list of historical, consecutive error values with the error value determined in block 838. After the media device 102 has updated the historical error list in block 830, the method 800 advances to block 832 in which the media device 102 returns the estimated amount of transferred media data as the read position of the DMA controller 150.

EXAMPLES

Illustrative examples of the technologies disclosed herein are provided below. An embodiment of the technologies may include any one or more, and any combination of, the examples described below.

Example 1 includes a compute device for rendering media, the compute device comprising a memory having at least one buffer for storing media data; a media player engine to copy the media data to the buffer and configure a data transfer rate of a render link of the compute device; a direct memory access (DMA) controller to initiate a transfer of blocks of the media data from the buffer to the render link at a start time, the transfer of blocks starting at a present read position of the buffer; and a position estimator to determine an estimated amount of transferred media data transferred by the DMA controller to the render link based on an elapsed time relative to the start time and the data transfer rate, wherein the position estimator is further to provide the estimated amount of transferred media data to the media player engine in response to a read position query received from the media player engine.

Example 2 includes the subject matter of Example 1, and wherein the media player engine is to copy the media data to the buffer based on the estimated amount of media data.

Example 3 includes the subject matter of any of Examples 1 and 2, and wherein the position estimator is further to determine a reported amount of transferred media data reported by the DMA controller and determine an error value indicative of a difference between the estimated amount of transferred media data and the reported amount of transferred media data.

Example 4 includes the subject matter of any of Examples 1-3, and wherein the position estimator is further to compare the error value to an error threshold value, wherein to provide the estimated amount of transferred media data comprises to provide the estimated amount of transferred media data in response to a determination that the error value satisfies the error threshold value.

Example 5 includes the subject matter of any of Examples 1-4, and wherein the position estimator is further to calculate a mean error value based on a reference number of previous error values in response to a determination that the error value does not satisfy the error threshold value, wherein each of the previous error values is indicative of a difference between a corresponding previously estimated amount of transferred media data and a corresponding previously reported amount of transferred media data, wherein to determine the estimated amount of transferred media data comprises to determine an estimated amount of transferred media data based on the mean error value in response to a determination that the mean error value satisfies a mean error threshold value.

Example 6 includes the subject matter of any of Examples 1-5, and wherein to determine the estimated amount of transferred media data based on the mean error value comprises to determine an initial estimated amount of transferred data transferred by the DMA controller to the render link based on the elapsed time relative to the start time and the data transfer rate; and adjust the initial estimated amount of transferred data by the mean error value to determine the estimated amount of transferred data.

Example 7 includes the subject matter of any of Examples 1-6, and wherein the position estimator is further to select a new mean error value in response to a determination that the mean error value does not satisfy the mean error threshold, wherein the new mean error value is indicative of a desired difference between the estimated amount of transferred media data and the reported amount of transferred media data, wherein to determine the estimated amount of transferred media data comprises to determine an estimated amount of transferred media data based on the new mean error value in response to a determination that the mean error value does not satisfy the mean error threshold value.

Example 8 includes the subject matter of any of Examples 1-7, and wherein to determine the estimated amount of transferred media data based on the new mean error value comprises to determine a new error value required to reduce the mean error to the selected mean error value when the new error value is included in the reference number of previous error values; determine an initial estimated amount of transferred data transferred by the DMA controller to the render link based on the elapsed time relative to the start time and the data transfer rate; and adjust the initial estimated amount of transferred data by the new error value to determine the estimated amount of transferred data.

Example 9 includes a method for rendering media, the method comprising copying, by a media player engine of a compute device, media data to a buffer of a compute device; configuring, by the media player engine, a data transfer rate of a render link of the compute device; initiating, by a direct memory access (DMA) controller of the compute device, a transfer of blocks of media data from the buffer to the render link at a start time, the transfer of blocks starting at a present read position of the buffer; determining, by a position estimator of the compute device, an estimated amount of transferred media data transferred by the DMA controller to the render link based on an elapsed time relative to the start time and the data transfer rate; and providing, by the position estimator and to the media player engine, the estimated amount of transferred media data in response to a read position query received from the media player engine.

Example 10 includes the subject matter of Example 9, and wherein copying the media data to the buffer comprises copying the media data to the buffer based on the estimated amount of media data.

Example 11 includes the subject matter of any of Examples 9 and 10, and further including determining, by the position estimator, a reported amount of transferred media data reported by the DMA controller and determine an error value indicative of a difference between the estimated amount of transferred media data and the reported amount of transferred media data.

Example 12 includes the subject matter of any of Examples 9-11, and further including comparing, by the position estimator, the error value to an error threshold value, wherein providing the estimated amount of transferred media data comprises providing the estimated amount of transferred media data in response to a determination that the error value satisfies the error threshold value.

Example 13 includes the subject matter of any of Examples 9-12, and further including calculating, by the position estimator, a mean error value based on a reference number of previous error values in response to a determination that the error value does not satisfy the error threshold value, wherein each of the previous error values is indicative of a difference between a corresponding previously estimated amount of transferred media data and a corresponding previously reported amount of transferred media data, wherein determining the estimated amount of transferred media data comprises determining an estimated amount of transferred media data based on the mean error value in response to a determination that the mean error value satisfies a mean error threshold value.

Example 14 includes the subject matter of any of Examples 9-13, and wherein determining the estimated amount of transferred media data based on the mean error value comprises determining an initial estimated amount of transferred data transferred by the DMA controller to the render link based on the elapsed time relative to the start time and the data transfer rate; and adjusting the initial estimated amount of transferred data by the mean error value to determine the estimated amount of transferred data.

Example 15 includes the subject matter of any of Examples 9-14, and further including selecting, by the position estimator, a new mean error value in response to a determination that the mean error value does not satisfy the mean error threshold, wherein the new mean error value is indicative of a desired difference between the estimated amount of transferred media data and the reported amount of transferred media data, wherein determining the estimated amount of transferred media data comprises determining an estimated amount of transferred media data based on the new mean error value in response to a determination that the mean error value does not satisfy the mean error threshold value.

Example 16 includes the subject matter of any of Examples 9-15, and wherein determining the estimated amount of transferred media data based on the new mean error value comprises determining a new error value required to reduce the mean error to the selected mean error value when the new error value is included in the reference number of previous error values; determining an initial estimated amount of transferred data transferred by the DMA controller to the render link based on the elapsed time relative to the start time and the data transfer rate; and adjusting the initial estimated amount of transferred data by the new error value to determine the estimated amount of transferred data.

Example 17 includes one or more non-transitory, machine-readable storage media comprising a plurality of instructions stored thereon that, when executed, causes a compute device to copy media data to a buffer of a compute device; configure a data transfer rate of a render link of the compute device; initiate, by a direct memory access (DMA) controller of the compute device, a transfer of blocks of media data from the buffer to the render link at a start time, the transfer of blocks starting at a present read position of the buffer; and determine an estimated amount of transferred media data transferred by the DMA controller to the render link based on an elapsed time relative to the start time and the data transfer rate.

Example 18 includes the subject matter of Example 17, and wherein to copy the media data to the buffer comprises to copy the media data to the buffer based on the estimated amount of media data.

Example 19 includes the subject matter of any of Examples 17 and 18, and wherein the plurality of instructions, when executed further cause the compute device to determine a reported amount of transferred media data reported by the DMA controller and determine an error value indicative of a difference between the estimated amount of transferred media data and the reported amount of transferred media data.

Example 20 includes the subject matter of any of Examples 17-19, and wherein the plurality of instructions, when executed further cause the compute device to compare the error value to an error threshold value, wherein to provide the estimated amount of transferred media data comprises to provide the estimated amount of transferred media data in response to a determination that the error value satisfies the error threshold value.

Example 21 includes the subject matter of any of Examples 17-20, and wherein the plurality of instructions, when executed further cause the compute device to calculate a mean error value based on a reference number of previous error values in response to a determination that the error value does not satisfy the error threshold value, wherein each of the previous error values is indicative of a difference between a corresponding previously estimated amount of transferred media data and a corresponding previously reported amount of transferred media data, wherein to determine the estimated amount of transferred media data comprises to determine an estimated amount of transferred media data based on the mean error value in response to a determination that the mean error value satisfies a mean error threshold value.

Example 22 includes the subject matter of any of Examples 17-21, and wherein to determine the estimated amount of transferred media data based on the mean error value comprises to determine an initial estimated amount of transferred data transferred by the DMA controller to the render link based on the elapsed time relative to the start time and the data transfer rate; and adjust the initial estimated amount of transferred data by the mean error value to determine the estimated amount of transferred data.

Example 23 includes the subject matter of any of Examples 17-22, and, wherein the plurality of instructions, when executed further cause the compute device to select a new mean error value in response to a determination that the mean error value does not satisfy the mean error threshold, wherein the new mean error value is indicative of a desired difference between the estimated amount of transferred media data and the reported amount of transferred media data, wherein to determine the estimated amount of transferred media data comprises to determine an estimated amount of transferred media data based on the new mean error value in response to a determination that the mean error value does not satisfy the mean error threshold value.

Example 24 includes the subject matter of any of Examples 17-23, and wherein to determine the estimated amount of transferred media data based on the new mean error value comprises to determine a new error value required to reduce the mean error to the selected mean error value when the new error value is included in the reference number of previous error values; determine an initial estimated amount of transferred data transferred by the DMA controller to the render link based on the elapsed time relative to the start time and the data transfer rate; and adjust the initial estimated amount of transferred data by the new error value to determine the estimated amount of transferred data.

The invention claimed is:

1. A compute device for rendering media, the compute device comprising:
 a memory having at least one buffer for storing media data;
 a media player engine to copy the media data to the buffer and configure a data transfer rate of a render link of the compute device;
 a direct memory access (DMA) controller to initiate a transfer of blocks of the media data from the buffer to the render link at a start time, the transfer of blocks starting at a present read position of the buffer;
 a position estimator to determine an estimated amount of transferred media data transferred by the DMA controller to the render link based on an elapsed time relative to the start time and the data transfer rate, wherein the position estimator is further to provide the estimated amount of transferred media data to the media player engine in response to a read position query received from the media player engine; and
 wherein a timing in which the media player engine is to copy the media data to the buffer is based on the estimated amount of transferred media data.

2. The compute device of claim 1, wherein the position estimator is further to determine a reported amount of transferred media data reported by the DMA controller and determine an error value indicative of a difference between the estimated amount of transferred media data and the reported amount of transferred media data.

3. The compute device of claim 2, wherein the position estimator is further to compare the error value to an error threshold value,
wherein to provide the estimated amount of transferred media data comprises to provide the estimated amount of transferred media data in response to a determination that the error value satisfies the error threshold value.

4. The compute device of claim 3, wherein the position estimator is further to calculate a mean error value based on a reference number of previous error values in response to a determination that the error value does not satisfy the error threshold value, wherein each of the previous error values is indicative of a difference between a corresponding previously estimated amount of transferred media data and a corresponding previously reported amount of transferred media data,
wherein to determine the estimated amount of transferred media data comprises to determine an estimated amount of transferred media data based on the mean error value in response to a determination that the mean error value satisfies a mean error threshold value.

5. The compute device of claim 4, wherein to determine the estimated amount of transferred media data based on the mean error value comprises to:
determine an initial estimated amount of transferred data transferred by the DMA controller to the render link based on the elapsed time relative to the start time and the data transfer rate; and
adjust the initial estimated amount of transferred data by the mean error value to determine the estimated amount of transferred data.

6. The compute device of claim 4, wherein the position estimator is further to select a new mean error value in response to a determination that the mean error value does not satisfy the mean error threshold, wherein the new mean error value is indicative of a desired difference between the estimated amount of transferred media data and the reported amount of transferred media data,
wherein to determine the estimated amount of transferred media data comprises to determine an estimated amount of transferred media data based on the new mean error value in response to a determination that the mean error value does not satisfy the mean error threshold value.

7. The compute device of claim 6, wherein to determine the estimated amount of transferred media data based on the new mean error value comprises to:
determine a new error value required to reduce the mean error to the selected mean error value when the new error value is included in the reference number of previous error values;
determine an initial estimated amount of transferred data transferred by the DMA controller to the render link based on the elapsed time relative to the start time and the data transfer rate; and
adjust the initial estimated amount of transferred data by the new error value to determine the estimated amount of transferred data.

8. A method for rendering media, the method comprising:
copying, by a media player engine of a compute device, media data to a buffer of a compute device;
configuring, by the media player engine, a data transfer rate of a render link of the compute device;
initiating, by a direct memory access (DMA) controller of the compute device, a transfer of blocks of media data from the buffer to the render link at a start time, the transfer of blocks starting at a present read position of the buffer;
determining, by a position estimator of the compute device, an estimated amount of transferred media data transferred by the DMA controller to the render link based on an elapsed time relative to the start time and the data transfer rate;
providing, by the position estimator and to the media player engine, the estimated amount of transferred media data in response to a read position query received from the media player engine; and
wherein a timing in which the media player engine of the compute device is to copy the media data to the buffer of the compute device is based on the estimated amount of transferred media data.

9. The method of claim 8, further comprising determining, by the position estimator, a reported amount of transferred media data reported by the DMA controller and determine an error value indicative of a difference between the estimated amount of transferred media data and the reported amount of transferred media data.

10. The method ice of claim 9, further comprising comparing, by the position estimator, the error value to an error threshold value,
wherein providing the estimated amount of transferred media data comprises providing the estimated amount of transferred media data in response to a determination that the error value satisfies the error threshold value.

11. The method of claim 10, further comprising calculating, by the position estimator, a mean error value based on a reference number of previous error values in response to a determination that the error value does not satisfy the error threshold value, wherein each of the previous error values is indicative of a difference between a corresponding previously estimated amount of transferred media data and a corresponding previously reported amount of transferred media data,
wherein determining the estimated amount of transferred media data comprises determining an estimated amount of transferred media data based on the mean error value in response to a determination that the mean error value satisfies a mean error threshold value.

12. The method of claim 11, wherein determining the estimated amount of transferred media data based on the mean error value comprises:
determining an initial estimated amount of transferred data transferred by the DMA controller to the render link based on the elapsed time relative to the start time and the data transfer rate; and
adjusting the initial estimated amount of transferred data by the mean error value to determine the estimated amount of transferred data.

13. The method of claim 11, further comprising selecting, by the position estimator, a new mean error value in response to a determination that the mean error value does not satisfy the mean error threshold, wherein the new mean error value is indicative of a desired difference between the estimated amount of transferred media data and the reported amount of transferred media data,
wherein determining the estimated amount of transferred media data comprises determining an estimated amount of transferred media data based on the new mean error value in response to a determination that the mean error value does not satisfy the mean error threshold value.

14. The method of claim 13, wherein determining the estimated amount of transferred media data based on the new mean error value comprises:
- determining a new error value required to reduce the mean error to the selected mean error value when the new error value is included in the reference number of previous error values;
- determining an initial estimated amount of transferred data transferred by the DMA controller to the render link based on the elapsed time relative to the start time and the data transfer rate; and
- adjusting the initial estimated amount of transferred data by the new error value to determine the estimated amount of transferred data.

15. One or more non-transitory, machine-readable storage media comprising a plurality of instructions stored thereon that, when executed, causes a compute device to:
- copy media data to a buffer of a compute device;
- configure a data transfer rate of a render link of the compute device;
- initiate, by a direct memory access (DMA) controller of the compute device, a transfer of blocks of media data from the buffer to the render link at a start time, the transfer of blocks starting at a present read position of the buffer;
- determine an estimated amount of transferred media data transferred by the DMA controller to the render link based on an elapsed time relative to the start time and the data transfer rate; and
- wherein a timing in which the media data is copied to the buffer of the compute device is based on the estimated amount of transferred media data.

16. The one or more non-transitory, machine-readable storage media of claim 15, wherein the plurality of instructions, when executed further cause the compute device to determine a reported amount of transferred media data reported by the DMA controller and determine an error value indicative of a difference between the estimated amount of transferred media data and the reported amount of transferred media data.

17. The one or more non-transitory, machine-readable storage media of claim 16, wherein the plurality of instructions, when executed further cause the compute device to compare the error value to an error threshold value,
- wherein to provide the estimated amount of transferred media data comprises to provide the estimated amount of transferred media data in response to a determination that the error value satisfies the error threshold value.

18. The one or more non-transitory, machine-readable storage media of claim 17, wherein the plurality of instructions, when executed further cause the compute device to calculate a mean error value based on a reference number of previous error values in response to a determination that the error value does not satisfy the error threshold value, wherein each of the previous error values is indicative of a difference between a corresponding previously estimated amount of transferred media data and a corresponding previously reported amount of transferred media data,
- wherein to determine the estimated amount of transferred media data comprises to determine an estimated amount of transferred media data based on the mean error value in response to a determination that the mean error value satisfies a mean error threshold value.

19. The one or more non-transitory, machine-readable storage media of claim 18, wherein to determine the estimated amount of transferred media data based on the mean error value comprises to:
- determine an initial estimated amount of transferred data transferred by the DMA controller to the render link based on the elapsed time relative to the start time and the data transfer rate; and
- adjust the initial estimated amount of transferred data by the mean error value to determine the estimated amount of transferred data.

20. The one or more non-transitory, machine-readable storage media of claim 18, wherein the plurality of instructions, when executed further cause the compute device to select a new mean error value in response to a determination that the mean error value does not satisfy the mean error threshold, wherein the new mean error value is indicative of a desired difference between the estimated amount of transferred media data and the reported amount of transferred media data,
- wherein to determine the estimated amount of transferred media data comprises to determine an estimated amount of transferred media data based on the new mean error value in response to a determination that the mean error value does not satisfy the mean error threshold value.

21. The one or more non-transitory, machine-readable storage media of claim 20, wherein to determine the estimated amount of transferred media data based on the new mean error value comprises to:
- determine a new error value required to reduce the mean error to the selected mean error value when the new error value is included in the reference number of previous error values;
- determine an initial estimated amount of transferred data transferred by the DMA controller to the render link based on the elapsed time relative to the start time and the data transfer rate; and
- adjust the initial estimated amount of transferred data by the new error value to determine the estimated amount of transferred data.

* * * * *